(12) United States Patent
Reid et al.

(10) Patent No.: US 10,065,256 B2
(45) Date of Patent: Sep. 4, 2018

(54) BRAZING SYSTEMS AND METHODS

(71) Applicant: Concept Group LLC, Wellesley, MA (US)

(72) Inventors: Aarne H Reid, Jupiter, FL (US); David H Reid, Jr., Fort Pierce, FL (US)

(73) Assignee: Concept Group LLC, Wellesley, MA (US)

( * ) Notice: Subject to any disclaimer, the term of this patent is extended or adjusted under 35 U.S.C. 154(b) by 0 days.

(21) Appl. No.: 15/337,102

(22) Filed: Oct. 28, 2016

(65) Prior Publication Data

US 2017/0120362 A1    May 4, 2017

Related U.S. Application Data

(60) Provisional application No. 62/248,433, filed on Oct. 30, 2015.

(51) Int. Cl.
*B23K 31/02* (2006.01)
*B23K 3/06* (2006.01)
*B23K 3/08* (2006.01)

(52) U.S. Cl.
CPC .............. *B23K 3/0638* (2013.01); *B23K 3/08* (2013.01)

(58) Field of Classification Search
CPC .......................................... B23K 3/06–3/0638
USPC ... 228/102–103, 105, 245–262, 8–12, 33–43
See application file for complete search history.

(56) References Cited

U.S. PATENT DOCUMENTS

| | | | | |
|---|---|---|---|---|
| 1,362,805 A * | 12/1920 | Kruse | ...................... | B23K 1/16 193/1 |
| 1,457,504 A * | 6/1923 | Cullen | ...................... | B23K 3/08 228/11 |
| 2,085,737 A * | 7/1937 | Joseph | ...................... | B23K 1/16 228/23 |
| 2,362,893 A * | 11/1944 | Durst | ................. | B23K 35/0222 148/26 |
| 2,573,594 A * | 10/1951 | Nofzinger | .............. | B23K 3/087 134/49 |
| 2,666,979 A | 1/1954 | Van Dusen | | |
| 2,807,074 A * | 9/1957 | Schroeder | ............... | B21C 37/24 228/232 |
| 2,867,242 A | 1/1959 | Harris et al. | | |
| 3,119,238 A | 1/1964 | Chamberlain et al. | | |
| 3,265,236 A | 8/1966 | Norman et al. | | |
| 3,460,512 A * | 8/1969 | Emmerich | ............. | B23K 3/063 118/111 |
| 3,510,323 A | 5/1970 | Wismer et al. | | |
| 3,706,208 A | 12/1972 | Kadi et al. | | |
| 3,760,142 A * | 9/1973 | Schoenthaler | ....... | B23K 1/0053 219/228 |
| 4,055,268 A | 10/1977 | Barthel | | |

(Continued)

FOREIGN PATENT DOCUMENTS

DE         10019420 A1 * 10/2001      ............ B23K 3/033
EP          1294022 A2    3/2003
(Continued)

*Primary Examiner* — Kiley S Stoner
(74) *Attorney, Agent, or Firm* — Baker & Hostetler LLP

(57) ABSTRACT

The present disclosure provides systems and methods for applying brazing material to substrates. The disclosed systems and methods suitably include applying brazing material to a substrate, collecting one or more images of the brazing material, and manipulating the substrate in response to the one or more images.

20 Claims, 7 Drawing Sheets

(56) References Cited

U.S. PATENT DOCUMENTS

| | | | |
|---|---|---|---|
| 4,399,919 A | 8/1983 | Posnansky et al. | |
| 4,653,469 A | 3/1987 | Miyaji et al. | |
| 4,696,104 A * | 9/1987 | Vanzetti | B23K 1/0056 228/103 |
| 4,903,631 A * | 2/1990 | Morris | B23K 1/085 118/600 |
| 5,038,706 A * | 8/1991 | Morris | B23K 1/085 118/404 |
| 5,052,816 A * | 10/1991 | Nakamura | G01N 25/72 228/105 |
| 5,108,390 A | 4/1992 | Potocky et al. | |
| 5,206,705 A * | 4/1993 | Tokura | B23K 31/12 356/237.5 |
| 5,235,817 A | 8/1993 | Gallagher et al. | |
| 5,411,897 A * | 5/1995 | Harvey | B23K 1/20 136/256 |
| 5,520,682 A | 5/1996 | Baust et al. | |
| 5,573,140 A | 11/1996 | Satomi et al. | |
| 5,600,752 A | 2/1997 | Lopatinsky | |
| 5,650,020 A * | 7/1997 | Ohta | B23K 31/12 148/24 |
| 5,674,218 A | 10/1997 | Rubinsky et al. | |
| 5,742,048 A * | 4/1998 | Kobayashi | B23K 3/0623 228/246 |
| 5,862,973 A * | 1/1999 | Wasserman | B23K 31/12 228/103 |
| 5,869,801 A * | 2/1999 | Paton | B23K 15/0046 219/121.12 |
| 5,870,823 A | 2/1999 | Bezama et al. | |
| 6,095,405 A * | 8/2000 | Kim | B23K 1/005 228/180.21 |
| 6,145,547 A | 11/2000 | Villatte | |
| 6,166,907 A | 12/2000 | Chien | |
| 6,186,390 B1 * | 2/2001 | Tadauchi | B23K 35/0227 228/56.3 |
| 6,360,935 B1 * | 3/2002 | Flake | B23K 1/0016 228/102 |
| 6,706,037 B2 | 3/2004 | Zvuloni et al. | |
| 6,875,209 B2 | 4/2005 | Zvuloni et al. | |
| 6,936,045 B2 | 8/2005 | Yu et al. | |
| 7,064,429 B2 | 6/2006 | Bemmerl et al. | |
| 7,139,172 B2 | 11/2006 | Bezama et al. | |
| 7,150,743 B2 | 12/2006 | Zvuloni et al. | |
| 7,203,064 B2 | 4/2007 | Mongia et al. | |
| 7,207,985 B2 | 4/2007 | Duong et al. | |
| 7,258,161 B2 | 8/2007 | Cosley et al. | |
| 7,298,623 B1 | 11/2007 | Kuczynski et al. | |
| RE40,049 E | 2/2008 | Li | |
| 7,334,630 B2 | 2/2008 | Goodson et al. | |
| 7,354,434 B2 | 4/2008 | Zvuloni et al. | |
| 7,356,434 B2 | 4/2008 | Wu et al. | |
| 7,361,187 B2 | 4/2008 | Duong et al. | |
| 7,374,063 B2 | 5/2008 | Reid | |
| 7,393,350 B2 | 7/2008 | Maurice | |
| 7,419,085 B2 * | 9/2008 | Fukunaka | B23K 31/125 219/121.78 |
| 7,451,785 B2 | 11/2008 | Taira et al. | |
| 7,460,369 B1 | 12/2008 | Blish, II | |
| 7,485,117 B2 | 2/2009 | Damasco et al. | |
| 7,497,365 B2 * | 3/2009 | Kimura | H01L 24/11 118/207 |
| 7,510,534 B2 | 3/2009 | Burdorff et al. | |
| 7,515,415 B2 | 4/2009 | Monfarad et al. | |
| 7,608,071 B2 | 10/2009 | Duong et al. | |
| 7,621,889 B2 | 11/2009 | Duong et al. | |
| 7,621,890 B2 | 11/2009 | Duong et al. | |
| 7,681,299 B2 | 3/2010 | Reid | |
| 7,909,227 B2 | 3/2011 | Duong et al. | |
| 8,353,332 B2 | 1/2013 | Reid | |
| 8,434,665 B2 * | 5/2013 | Motomura | H05K 3/363 228/178 |
| 9,243,726 B2 | 1/2016 | Reid | |
| 2001/0030225 A1 * | 10/2001 | Nagata | B23K 3/0607 228/256 |
| 2003/0079554 A1 | 5/2003 | Van Cleve | |
| 2003/0146224 A1 | 8/2003 | Fujii et al. | |
| 2004/0129756 A1 * | 7/2004 | Zakel | B23K 3/0607 228/9 |
| 2004/0226979 A1 * | 11/2004 | Sato | B23K 1/0056 228/41 |
| 2005/0211711 A1 | 9/2005 | Reid | |
| 2006/0071052 A1 * | 4/2006 | Conlon | G01N 21/6456 228/103 |
| 2006/0076389 A1 * | 4/2006 | Kemper | B23K 1/008 228/103 |
| 2006/0086773 A1 * | 4/2006 | Sanftleben | G01N 21/95684 228/103 |
| 2007/0102477 A1 * | 5/2007 | Prince | B23K 3/0638 228/39 |
| 2007/0102478 A1 * | 5/2007 | Prince | B23K 3/0638 228/39 |
| 2007/0235497 A1 * | 10/2007 | Hsu | B23K 1/0012 228/51 |
| 2007/0235498 A1 * | 10/2007 | Hsu | B23K 1/0012 228/51 |
| 2007/0235499 A1 * | 10/2007 | Hsu | B23K 1/0012 228/51 |
| 2007/0246510 A1 * | 10/2007 | Hsu | B23K 1/0012 228/101 |
| 2008/0036076 A1 | 2/2008 | Ouyang | |
| 2008/0061111 A1 * | 3/2008 | Kiriyama | H01L 31/188 228/47.1 |
| 2008/0083816 A1 * | 4/2008 | Leinbach | B23K 3/0638 228/102 |
| 2008/0121642 A1 | 5/2008 | Reid | |
| 2008/0197170 A1 * | 8/2008 | Prince | G01N 21/8806 228/103 |
| 2008/0285230 A1 | 11/2008 | Bojan et al. | |
| 2009/0068070 A1 | 3/2009 | Hashimoto et al. | |
| 2009/0152331 A1 * | 6/2009 | Schmitt | B23K 35/3612 228/256 |
| 2010/0057064 A1 | 3/2010 | Baust et al. | |
| 2010/0057067 A1 | 3/2010 | Baust et al. | |
| 2010/0076421 A1 | 3/2010 | Baust et al. | |
| 2011/0264084 A1 | 10/2011 | Reid | |
| 2012/0085070 A1 | 4/2012 | Chou et al. | |
| 2012/0090817 A1 | 4/2012 | Reid | |
| 2012/0175007 A1 | 7/2012 | Pan et al. | |
| 2012/0228364 A1 * | 9/2012 | Vegelahn | G01B 11/0616 228/105 |
| 2012/0318808 A1 | 12/2012 | McCormick | |
| 2013/0105496 A1 | 5/2013 | Jung | |
| 2014/0008417 A1 | 1/2014 | Visser et al. | |
| 2014/0090737 A1 | 4/2014 | Reid | |
| 2015/0110548 A1 | 4/2015 | Reid | |
| 2015/0151893 A1 | 6/2015 | Wengreen et al. | |
| 2015/0159800 A1 | 6/2015 | Kimura et al. | |
| 2015/0260332 A1 | 9/2015 | Reid | |
| 2015/0271927 A1 * | 9/2015 | Cocklin | B23K 3/0615 228/180.5 |
| 2015/0345930 A1 * | 12/2015 | Ikeda | H05K 13/0465 356/630 |
| 2016/0279725 A1 * | 9/2016 | Azdasht | B23K 1/0056 |
| 2016/0354853 A1 * | 12/2016 | Azdasht | B23K 1/0056 |
| 2016/0368072 A1 * | 12/2016 | Senga | B23K 3/0638 |
| 2017/0062774 A1 | 3/2017 | Reid | |
| 2017/0165773 A1 * | 6/2017 | Azdasht | B23K 3/0623 |

FOREIGN PATENT DOCUMENTS

| | | | |
|---|---|---|---|
| GB | 2105226 A * | 8/1981 | |
| JP | 06142909 A * | 5/1994 | |
| JP | 2005224832 A * | 8/2005 | |
| JP | 3962782 B1 * | 8/2007 | B23K 3/0478 |
| JP | 2008045956 A * | 2/2008 | B23K 3/0478 |
| WO | 03/25476 A2 | 3/2003 | |

* cited by examiner

US 10,065,256 B2

BRAZING SYSTEMS AND METHODS

RELATED APPLICATION

The present application claims priority to and the benefit of United States Patent Application No. 62/248,433, "Improved Brazing Systems" (filed Oct. 30, 2015), the entirety of which application is incorporated herein for any and all purposes.

TECHNICAL FIELD

The present disclosure relates to the field of brazing processes and to the field of precision parts manufacture.

BACKGROUND

Brazing precision parts presents a number of challenges to the user, including production of consistent parts across different batches of brazing material. Different batches of brazing material can have different characteristics (e.g., viscosity), which different characteristics can result in variability between parts made with the different batches. Accordingly, there is a long-felt need in the art for systems and methods capable of producing consistent brazed parts.

SUMMARY

In meeting these long-felt needs, the present disclosure first provides brazing systems, the systems comprising an applicator configured to deliver an amount of a brazing material to a region of a surface of a substrate; a source of illumination configured to illuminate the applied brazing material; and an imager configured to visualize illuminated brazing material applied to the surface of the substrate.

The present disclosure also provides methods, comprising (a) applying an amount of brazing material to a first substrate; (b) illuminating at least a portion of the applied brazing material with a source of illumination; and (c) collecting at least one image of the illuminated applied brazing material. The methods may also include (d) manipulating the first substrate in response to the at least one image.

Also provided herein are methods, comprising (a) applying an amount of brazing material to a first substrate; (b) illuminating at least a portion of the applied brazing material with a source of illumination; (c) collecting at least one image of the illuminated applied brazing material; and (d) applying an amount of brazing material to a second substrate in response to the at least one image.

BRIEF DESCRIPTION OF THE DRAWINGS

The summary, as well as the following detailed description, is further understood when read in conjunction with the appended drawings. For the purpose of illustrating the invention, there are shown in the drawings exemplary embodiments of the invention; however, the invention is not limited to the specific methods, compositions, and devices disclosed. In addition, the drawings are not necessarily drawn to scale. In the drawings.

DETAILED DESCRIPTION OF ILLUSTRATIVE EMBODIMENTS

Figure 1:
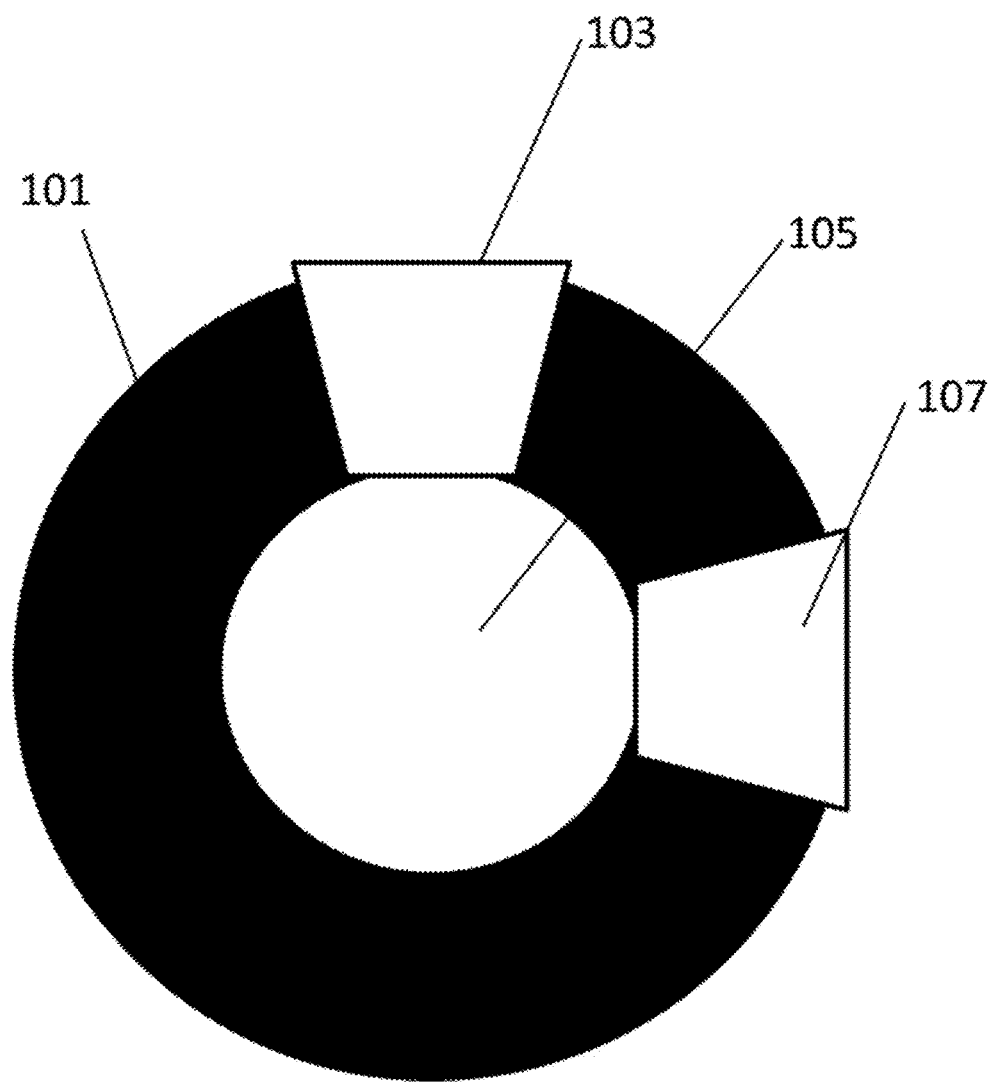
FIG. 1 depicts an exemplary head-on view of an amount of brazing material applied to a tubular substrate.

The present invention may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

It is to be appreciated that certain features of the invention which are, for clarity, described herein in the context of separate embodiments, may also be provided in combination in a single embodiment. Conversely, various features of the invention that are, for brevity, described in the context of a single embodiment, may also be provided separately or in any subcombination. Further, reference to values stated in ranges include each and every value within that range.

In one aspect, the present disclosure provides brazing systems. The systems suitably include an applicator configured to deliver an amount of a brazing material to a region of a surface of a substrate; a source of illumination configured to illuminate the applied brazing material; and an imager configured to visualize illuminated brazing material applied to the surface of the substrate.

A variety of applicators may be used in the disclosed systems. Print heads, syringe pumps, screw dispensers, gear pumps, and the like are all considered suitable for dispensing brazing material. A user may also use a pre-formed ring of brazing material, which ring may be set in place (e.g., via sliding the ring along a cylindrical substrate) and then further processed, e.g., via melting. A user may use the disclosed systems to assess (and adjust, if needed) the location of such a ring of brazing material.

An applicator may dispense any amount of brazing material desired; in some embodiments, the applicator is used to dispense brazing material in a ribbon having a cross-sectional dimension (e.g., height, width) in the range of from about 0.005 inches to 0.5 inches, e.g., 0.5 inches, or even 0.25 inches (and all intermediate values). An exemplary braze ribbon thickness is from about $^{15}/_{1000}$ to about $^{25}/_{1000}$ inches in thickness. An applicator may dispense brazing material in a continuous fashion. Alternatively, an applicator may dispense brazing material in a discrete fashion.

It should be understood that brazing material may be applied in virtually any configuration. For example, brazing material may be applied in a line. Material may also be applied in a curve or other pattern. Application of the brazing material may be effected in a manual manner (e.g., via a user directing the movement of an applicator or dispensing head). Brazing material application may also be effected in an automated manner, e.g., by having an applicator or dispensing head, such as a print head, follow preset instructions that specify the amount of material to be dispensed and the form (lines, curves, zig-zags, dots, dashes, and the like) that the dispensed material may take. It should be understood that brazing material may be applied to the outside or inside of a substrate, e.g., along the inner surface of a tubular substrate.

Application of brazing material may be effected by relative motion between the substrate and the material applicator. This may be accomplished by moving one or both of the substrate and applicator during brazing material application. The motion of one or both of the substrate and applicator may be accomplished manually or in an automated fashion.

Figure 4:
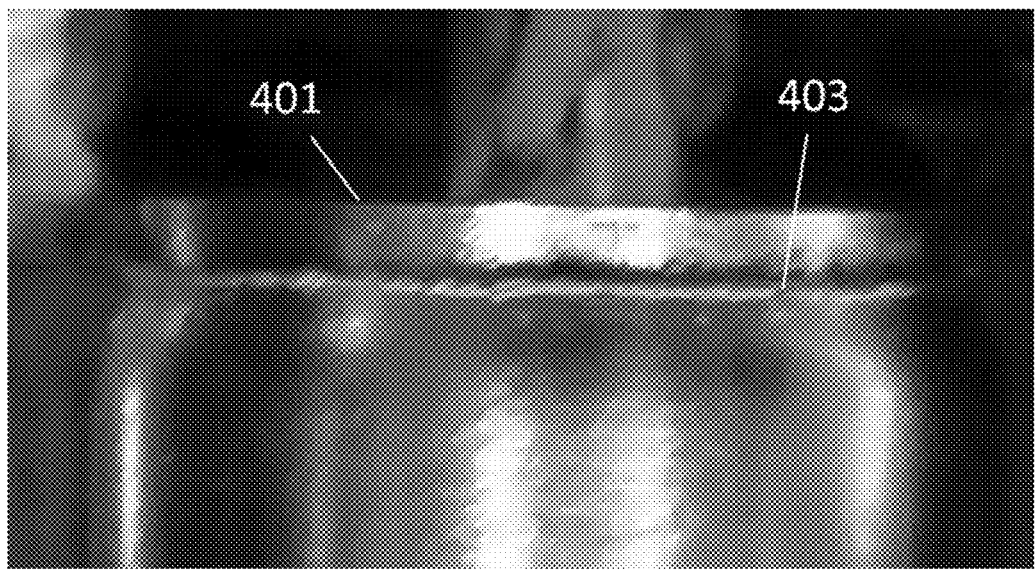
FIG. 4 illustrates an exemplary tubular substrate with an amount of brazing material applied around the circumference of one end of the substrate.

FIG. 4 illustrates an exemplary substrate with an exemplary amount of brazing material. As shown in the figure, a ribbon (or bead) of brazing material 403 has been applied around the outer circumference of a tubular substrate 401, which tubular substrate includes regions of increased and decreased diameter. In this example, the brazing material has been applied where the substrate's diameter decreases (i.e., where the substrate "necks in"), although the brazing material may, of course, be applied to any region of a substrate.

A system may be configured to dispense different amounts of material at different locations on a substrate. For example, a system may be configured to dispense a ribbon of brazing material of a first width at a first location on a substrate and dispense a ribbon of brazing material of a second width at a second location on the substrate.

Material may be applied to a substrate axially, circumferentially, or in any other orientation. It should be understood that the disclosed technology may be used to apply brazing material in any pattern to a substrate of any shape or topography. Brazing material may be applied in a continuous fashion, but may also—as described elsewhere herein—be applied in a discontinuous or discrete fashion.

Figure 6:
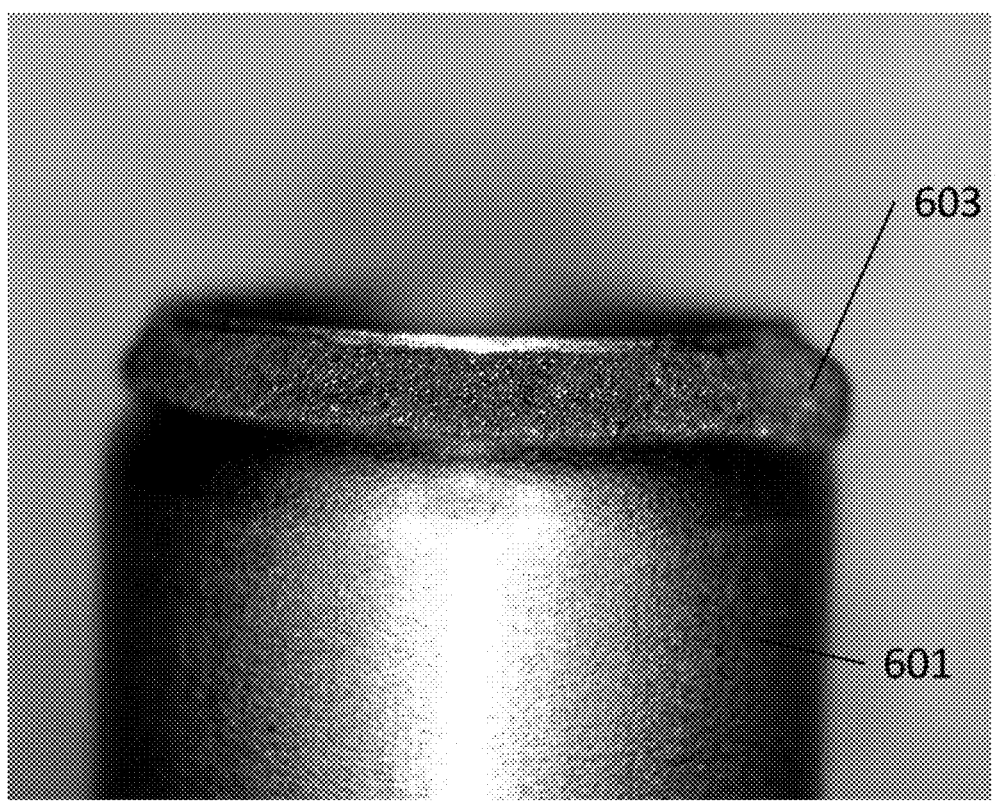
FIG. 6 depicts an exemplary tubular substrate with an amount of brazing material applied circumferentially around the end of the substrate.

FIG. 6 illustrates an exemplary amount of brazing material 603 applied circumferentially around an end of a tubular substrate 601. Brazing material may be cured in place before being further processed to join two parts or to form a seal between two parts. As seen in FIG. 6, brazing material 603 may include an amount of particulate material or beads. The cross-section of the applied brazing material may be circular, semicircular, symmetric, or even asymmetric. As described elsewhere herein, the brazing material may be applied in a range of thicknesses.

The system may include a device for manipulating the substrate. Such a device may include a roller (e.g., a roller configured to spin or rotate a substrate), a moveable stage, a spinner, a moveable clamp, a picker, a claw, a magnet, and the like. The system may also, of course, include a moveable dispenser of brazing material. One or more of the dispenser and substrate are suitably moveable relative to one another. For example, the dispenser may orbit the substrate, or vice versa. The substrate may rotate while the dispenser remains stationary.

Figure 5:
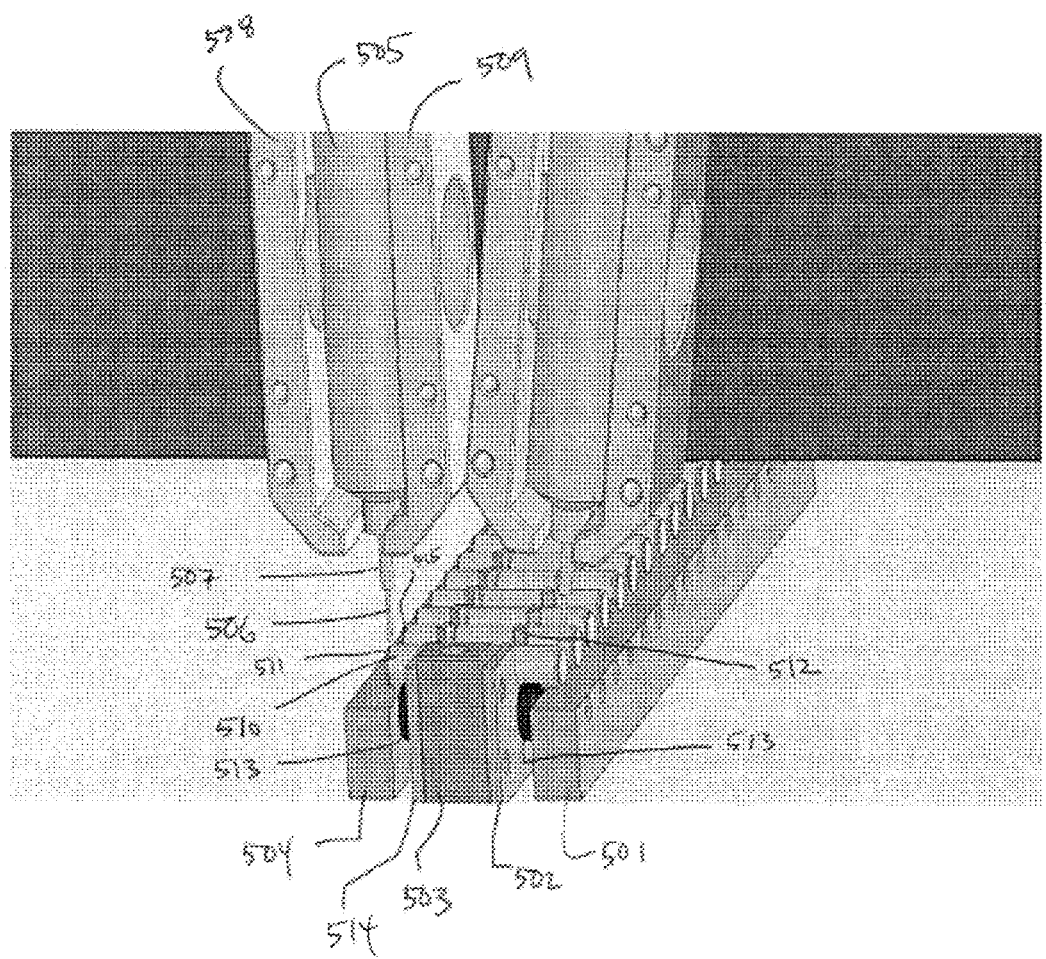
FIG. 5 depicts an exemplary system according to the present disclosure.

FIG. 5 depicts an illustrative system. In that figure, tubular substrate 510 contacts spinning wheel 513. It should be understood that spinning wheel 513 may be powered so as to rotate substrate 510. In some embodiments, wheel 513 is unpowered, and a substrate is rotated via motion of another moving part (not shown), such as a drive wheel.

Wheel 513 may rotate in either direction and may rotate continuously or through only a specified angle. Wheel 513 may be supported by an axle that extends through one or more of rails 501 and 504 and plates 502 and 514. Central portion 503 may also lend support to one or more wheels or axles. One or more separators 512 may be disposed so as to maintain separation between neighboring substrates, e.g., to prevent adjacent rotating substrates from touching one another.

Brazing material dispenser 505 is suitably positioned above substrate 510, though the dispenser may be positioned in any orientation or position relative to the substrates. Dispenser 505 may also be supported by dispenser supports 508 and 509. It is not a requirement that the dispenser have one, two, or more supports, as the dispenser may be connected to a moveable element, e.g., a stage. Supports may likewise be connected to moveable elements, which elements allow for movement of the brazing material dispenser, e.g., relative to the substrate. As shown, these supports allow for simple removal of dispenser 505, e.g., for replacing the dispenser, for refilling the dispenser, or for other maintenance. Supports 509 and 509 may maintain dispenser 505 in position. The supports may also be moveable in one, two, or three dimensions. The movement of the supports may be automated.

Dispenser 505 may include a narrowed region, e.g., nozzle 507. Nozzle 507 allows for controlled dispensing of the brazing material. Nozzle 507 may include a further narrowed portion 506. The brazing material is then dispensed from the narrowed portion 506 to form a ribbon of brazing material 511 at the end 515 of substrate 510.

An illumination source (not shown) may also be present. Various illumination sources are considered suitable, e.g., a source of visible light, a source of UV light, a source of IR light, and others. The illumination source may be disposed to illuminate the substrate, the applied brazing material, the dispenser, or any other aspect of the system. The illumination source may be moveable or may be stationary. An illumination source may include one, two, or more illumination modalities. As one example, an illumination source may include a bulb that produces visible light as well as a separate source of UV light. The illumination source may operate in a continuous or a burst fashion.

In one exemplary operation, dispenser 505 operates so as to apply brazing material to successive substrates, e.g., first applying brazing material to substrate 510, and then to substrate 515, and then on to further substrates. A dispenser may apply the brazing material to adjacent substrates in sequence, but this is not a requirement. Dispenser 505 may move relative to the substrate or substrates, but the substrate or substrates may also move relative to dispenser 505.

As explained above, wheel 513 may turn in a manner such that the wheel rotates a substrate through 360 degrees, thus allowing for application of brazing material around the circumference of the substrate. Again, a substrate may be rotated by wheel 513, but it is not a requirement that wheel 513 be powered or motorized, as wheel 513 may operate to support the substrate, and the substrate may be rotated by some other article (e.g., another wheel).

Because the disclosed systems may be operated in an automated or otherwise controllable manner, the system may be configured to apply brazing material around only a portion of a substrate. To accomplish this, wheel 513 may rotate to as to rotate substrate 510 from 0 degrees to 5 degrees while brazing material is applied, and then from 150 degrees to 155 degrees, again while brazing material is applied. In this way, a tubular substrate may be rotated such that brazing material is present at only particular locations around the circumference of the tubular substrate. Alternatively, wheel 513 may support a substrate as the substrate is rotated by another wheel, as shown in FIG. 7.

A circular substrate (e.g., a disc) may also be rotated in a similar manner (not shown). The circular substrate may be rotated such that brazing material is applied around the circumference of the disc.

Figure 7:
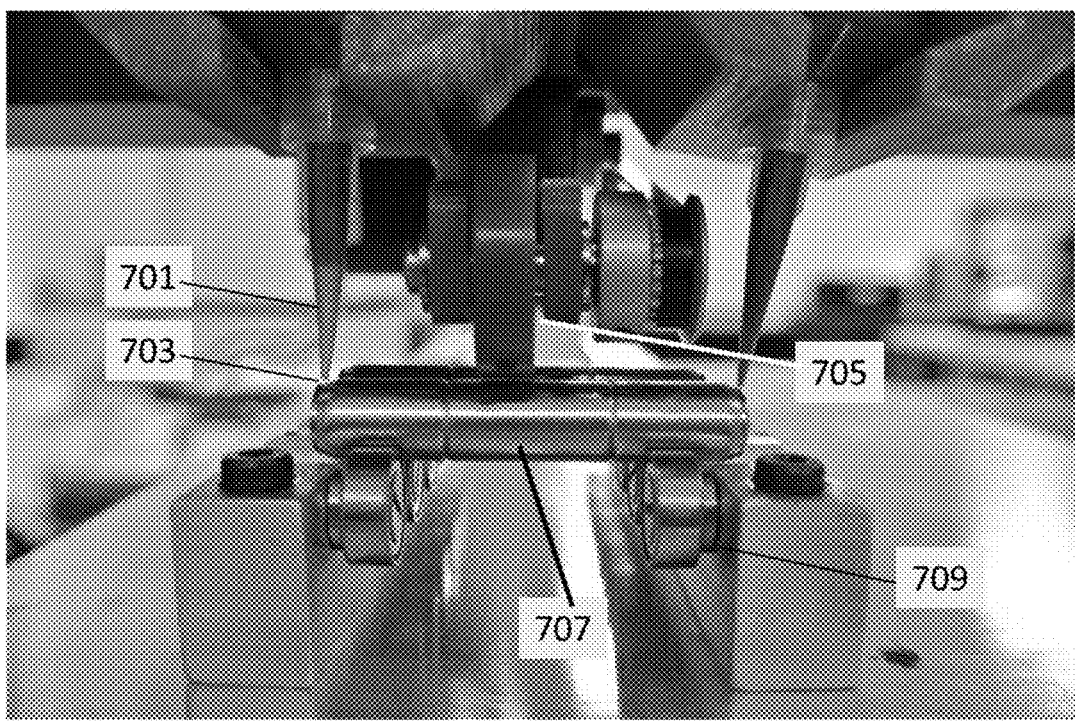
FIG. 7 illustrates an exemplary system according to the present disclosure, which system is configured to apply brazing material circumferentially around cylindrical substrates.

A photograph of an illustrative system is provided in FIG. 7. As shown in that figure, brazing material 703 is dispensed from conical dispensers 701. Dispensing may be effected by, e.g., a syringe pump, a gear pump, a gravity feed, or other dispensing methods known to those of skill in the art.

As shown in FIG. 7, a rotating wheel 705 (disposed between the two conical dispensers) may be used to rotate the tubular substrates 707 located beneath the brazing material dispensers. Alternatively, another system portion that is part of the dispenser assembly (shown here between the left- and right-hand conical dispensers) may contact and then rotate the tubular substrates. The tubular substrates may rest on free-spinning wheels or casters 709 that allow the substrates to move (e.g., rotate) freely. Exemplary such casters are shown beneath the substrates in FIG. 7.

A system may be configured to apply brazing material at one or more locations on a substrate. The exemplary system in FIG. 7 illustrates a system capable of delivering brazing material simultaneously at both ends of a cylindrical (tubular) substrate.

Sources of visible light (e.g., incandescent bulbs, LEDs, halogen light sources, and the like) are all considered suitable. The illumination source may include one or more filters used to filter particular portions of the spectrum, depending on the user's needs. The illumination source may also be a source of infrared illumination (including near-infrared, mid-infrared, and far-infrared, as defined by ISO 20473). The illumination source may also be a source of ultraviolet illumination (i.e., from about 400 nm to about 100 nm) illumination. An illumination source may be configured to provide two (e.g., ultraviolet and infrared) or more types of illumination.

One may select the illumination source based on the source's ability to visualize the presence (or absence) of brazing material on the substrate. As one example, if a user uses brazing material that includes a component that has particular luminescence when exposed to illumination of 450 nm or even about 450 nm, the user may select an illumination source (and imager) that permit visualization of that brazing material by using illumination having a wavelength of 450 nm or even about 450 nm.

An imager is suitably configured so as to collect one or more images of the brazing material disposed on the substrate surface. The imager may be a camera (CCD, video camera, still camera, and the like) that collects images from visual illumination, infrared illumination, or ultraviolet illumination.

An imager may collect still images, video clips, or both. The illumination source may be integrated into the imager or may be separate from the imager. As one example, cameras made by Keyence (www.keyence.com) are considered especially suitable. Imagers may include video sensor with filters, as well as lighting in one or more wavelengths (UV, IR, visible light).

The imager may be configured to collect an image of the brazing material that is normal to the surface of the substrate to which the brazing material has been applied, that is parallel to the surface of the substrate to which the brazing material has been applied, or even at an angle (acute or obtuse) to the surface of the substrate to which the brazing material has been applied. The disclosed systems may collect multiple images of a substrate and brazing material so as to allow for review from multiple perspectives. The system may configured to allow for automatic (or manual) review of images of substrates; the review may include comparing different substrate/brazing material samples against one another as well as comparing substrate/brazing material samples against an image showing a desired shape/configuration of a substrate/brazing material sample.

As one example, a user may desire to produce substrates having a ring of brazing material of 3 mm height and 1 mm thickness disposed around the circumference of the substrate. A user may obtain an image of one such substrate and then use that image as a target image against which other samples images are compared. In the event of a discrepancy between a sample and the target image (e.g., a missing region of brazing material), the system may be configured to further process that sample so as to resolve the discrepancy (e.g., by adding additional brazing material to the desired location) or even to discard (and recycle, where appropriate) that sample.

The imager may be configured to collect an image of the applied brazing material along the entirety of a length, width, or other cross-sectional dimension of the brazing material of a sample. As one example, an imager may be configured to image the thickness of the brazing material along at least 80% or even at least 90% of the length of the amount of brazing material. In this way, the disclosed systems permit inspection of some or all of the applied brazing material. Inspection may be performed in a head-on manner, in a side-on manner, or even at an angle. In some embodiments, the system effects relative motion between the imager and the sample so as to allow for imaging of the desired portions of the sample.

As one example, imaging may be performed by a device looking axially (head-on) at a tubular substrate having a bead of brazing material applied around the circumference of one end of the tube. In this way, the system may determine whether the bead is of uniform height, relative to the substrate to which the bead is applied. The system may evaluate the variation, if any, in the height of the bead of brazing material.

In a side-on imaging, an imager is oriented radially relative to a cylindrical substrate. In this way, the imaging can assess whether a circumferential band of brazing material is properly aligned (e.g., is straight). An angle view allows for assessment of both braze ribbon height and braze ribbon orientation. As described elsewhere herein, the system may effect relative motion between the imager and the sample (e.g., rotation of the sample while the imager remains stationary) to allow for inspection of the desired locations on the sample.

The imager is suitably connected to a processor. The processor may be configured to compare one or more images against one another so as to identify locations on an image to be addressed. The processor may be configured to highlight areas on an image that do not conform with a target image or that do not otherwise conform to the specifications for the part shown in the image. The system may then be configured to mark the article (or to generate or mark a record related to that article) for discarding, further processing, or further investigation.

As one example, a system may be configured to inspect three parts and determine the height of the braze ribbons applied to those three parts. After determining that the braze ribbon on the third part was not within specifications, the system marks the third part (or create/identify a record corresponding to that part, such as a computer memory record) for additional application of braze material or even for discarding. The system may also mark the part (or a corresponding record) with the location or locations at which additional brazing material is needed so that upon further processing, the proper amount of braze material is applied to the necessary location or locations.

A system may be configured to inspect brazing material at one, two, or more locations. A system may also be configured to inspect brazing material under one, two, or more types (e.g., infrared, ultraviolet, visible) of illumination.

In some embodiments, the system is configured to dispense an amount of brazing material delivered by the applicator in response to one or more images collected by the imager. The system may also be configured to adjust an amount of brazing material delivered by the applicator in response to one or more images collected by the imager.

As one example, the system may be configured to evaluate an image of brazing material disposed on a first substrate and then dispense less brazing material onto a subsequent substrate than the system dispensed onto the first substrate. Alternatively, the system may be configured to dispense more brazing material onto a subsequent substrate than the system dispensed onto the first substrate.

As another example, the system may also be configured to dispense brazing material onto the first substrate in response to an image (or images) collected of the first substrate. This may be performed where the image illustrates that additional brazing material is needed at one or more locations, e.g., if a ribbon of brazing material does not extend as far as desired. As one such example, a ribbon of brazing material may extend around only 90% of the circumference of a tubular substrate instead of extending around 100% of the tubular substrate's circumference. Likewise, such a situation may exist when a ribbon of brazing material has a width that is less than the desired width. In this way, the disclosed systems permit a user to correct a part (which may also be known as a workpiece) that may have an imperfection, thus improving product yield.

It should be understood that brazing material may be applied in any direction or conformation and that the circumferential ribbon described above does not limit the configuration of the applied brazing material or the type of substrate to which the brazing material is applied. As one example, brazing material may be applied around a perimeter of a planar substrate. As another example, brazing material may be applied along a portion of a planar substrate. Brazing material may be applied as circles, stripes, zig-zags, spirals, and as any other line or shape. Some exemplary substrates and brazing material configurations may be found in United States published patent application nos. US2015/0110548, US2014/0090737, US2012/0090817, US2011/0264084, US2008/0121642, and U52005/0211711, all by A. Reid, and all incorporated herein by reference in their entireties for any and all purposes.

In other embodiments, the system is configured to manipulate the substrate in response to one or more images collected of the first substrate. As on example, the system may be configured to convey the substrate to a location for further processing, e.g., a heated location for brazing, a vacuum furnace for brazing, a wrapping/boxing location for packaging, a holding area to await further processing, and the like.

The system may also be configured to convey the substrate (via conveyor belt, claw, picker, ball bearings, or other modality) to a discard area, such as a trash bin or other container for further disposal. The system may be configured to do so in an automated fashion or in a manual fashion wherein a user effects manipulation of the substrate. A system may be configured to record information regarding the number of parts that have brazing material applied within specification, the number of parts that have excess brazing material, the number of parts that have insufficient brazing material, and the like. In this manner, the disclosed systems track their own performance, thus allowing a user to isolate particular routines or inputs.

As one non-limiting example, the disclosed systems may be configured to return a substrate to a location for further brazing material application when an image of the part illustrates that the brazing material has not been applied as desired (e.g., an insufficient amount of brazing material has been applied). The system may also be configured to maintain the substrate in a location for further brazing material application, e.g., when an insufficient amount of brazing materials has been applied. A system may be configured to perform image analysis to determine whether and where to apply additional brazing material. For example, in an instance when there are gaps in a circumferential ribbon of brazing material, the system may be configured to apply additional brazing material in amounts sufficient to fill in the gaps.

The disclosed systems may also be configured to remove brazing material in response to one or more images collected of the brazing material on a substrate. As one example, if a ribbon of brazing material has been applied such that the ribbon does lacks one or more desired characteristics (e.g., shape, thickness), then the system may be configured to remove at least a portion of the misapplied brazing material (e.g., via mechanical means, by chemical means such as solvents, or both) and then return the substrate for application (or reapplication) of brazing material.

For example, a system may be configured to identify an irregularly-applied ribbon of brazing material applied to a tubular substrate, remove that material from the substrate, and then re-apply brazing material to that same substrate. In this way, the disclosed system increase process yield and allow for re-use of substrates having mis-applied brazing material thereon.

The disclosed systems may also include a supply of brazing material, e.g., a paste. Brazing material may include two or more components (e.g., two or more metals), and a brazing material may include components such that at least one of the components has greater visibility under the source of illumination than another component of the brazing material. As one example, a brazing material may include nickel and gold, where gold is more visible under a particular wavelength of illumination than is nickel under that same wavelength of illumination. This is not a requirement, however, as a brazing material may comprise a single component. A brazing material may have uniform visibility throughout under a particular wavelength of illumination. The brazing material may also be configured such that it has a different visibility under a particular wavelength than the substrate to which the brazing material is applied.

As another example, brazing material may include an additive (e.g., a fluorescent dye or other material visible or otherwise active under a particular wavelength of infrared illumination) that is visible under an illumination that the system provides. The source of illumination may be operated in a continuous mode or in a mode in which the source delivers a flash of illumination at the appropriate time. Other additives may be incorporated into the brazing material so as to allow for or even enhance visualization (automated and/or manual) of that material.

The disclosed technology may be used to evaluate a part (i.e., a substrate having brazing material disposed thereon) before brazing material application is complete. This allows for application adjustment at an intermediate stage of processing. For example, the technology may be used to image or even image and analyze brazing material application in real-time or as the material is applied. By doing so, the technology allows for brazing material application to be corrected as a part is being processed; e.g., to allow correction in real time during manufacture.

Brazing material may also include one or more additives used to adjust the viscosity of the material. Brazing material that includes a chemiluminescent, phosphorescent, fluorescent, or other luminous material is considered especially suitable.

A user may select a brazing material, substrate, and illumination source such that the presence (or absence) of the brazing material is perceptible to the user and/or the system. The disclosed systems and methods may be used to visualize the substrate and brazing material, but may also be used to visualize brazing material only.

A variety of brazing materials may be use, e.g., nickel-based brazing pastes. Commercially-available brazing pastes may be used, and the pastes may have one or more additives included therein. Pastes may include bronze, copper, silver, aluminum, nickel, gold, iron, silicon, boron, chromium, and other species. A paste may include particulates (e.g., metals, such as 100, 200, 300, or 400 mesh particulates), which particulates are mixed with a binder, e.g., a polymeric binder (e.g., PVA) or a water-based binder. The type and amount of binder may be selected to confer particular viscosity properties on the brazing material so as to enable dispensing of the material. The type and amount of binder may also be selected so as to provide a brazing material capable of maintaining its shape and position following application. A system according to the present disclosure may be configured to apply or remove a coating (e.g., a polymeric coating) to or from a substrate.

A system may include one, two, or more supplies of brazing material. As one example, the system may include a supply of copper-containing brazing material and also a supply of an iron-containing brazing material. The materials may be applied separately, but may also be admixed at the time and location of application or even before application.

The present disclosure also provides methods. The methods suitably comprise (a) applying an amount of brazing material to a first substrate; (b) illuminating at least a portion of the applied brazing material with a source of illumination; (c) collecting at least one image of the illuminated applied brazing material. The methods may also include (d) manipulating the first substrate in response to the at least one image.

Applying brazing material may be accomplished by, e.g., the applicators described elsewhere herein. Suitable sources of illumination are also described elsewhere herein. Image collection may be accomplished by one or more of the imagers that are described herein, although the list of imagers is not exclusive.

Manipulating the first substrate may include, e.g., conveying the first substrate to a heated location, conveying the first substrate to a holding location, changing the spatial orientation of the first substrate (e.g., via rotation), adding additional brazing material to the first substrate, removing brazing material from the first substrate, reshaping brazing material on the first substrate, brazing the first substrate to a second substrate, or any combination thereof. The methods may include using the at least one image of the illuminated brazing material to guide one or more follow-on process steps.

As one example, if an image of the applied brazing material reveals that there is insufficient material at one or more locations, the substrate may be conveyed to a holding area to await further processing, such as addition of further brazing material to the needed locations on the substrate. Alternatively, the substrate may be held at a location where brazing material is applied so as to allow for application of additional brazing material to cure the earlier insufficient application of such material. The substrate may also be conveyed to a reject location or even discarded. Any of the foregoing may be accomplished in a manual manner (e.g., by way of a user manually selecting and discarding a substrate that has been marked as out of specification).

In some embodiments, manipulating comprises applying additional brazing material to the first substrate. This may be done—as described elsewhere herein—by applying additional brazing material at one or more locations (e.g., gaps in a ribbon of brazing material) that are deficient in brazing material. Alternatively, the methods may include removing brazing material from one or more locations where there is too much brazing material.

Any of foregoing actions (a), (b), (c), or (d) may be performed in an automated fashion, in a manual fashion, or any combination thereof. For example, the methods may include automated addition of brazing material to one or more locations of a substrate that lack the desired amount of brazing material. The method may include automatically applying a ribbon of brazing material to a substrate based on a pre-set program, manually (or automatically) evaluating an image of the applied brazing material to determine whether the ribbon of brazing has any gaps or other unwanted features, and automatically applying an additional amount of brazing material to any gaps or unwanted features such that the substrate has the desired placement (and amount) of brazing material. In this way, the present disclosure allows a user to improve and maintain batch-to-batch consistency between different supplies of substrates, processing conditions, and brazing materials—brazing materials in particular may have variation between batches/supplies, and the present technology permits a user to produce consistent parts even when using two different batches of brazing material that may have different viscosities and hence different application characteristics.

For example, a first batch of brazing material may have a viscosity of X, and attains the desired application characteristics (ribbon width) under an application extrusion pressure of Y. A second batch of the brazing material, however, may have a viscosity of 0.75X, and thus attains different application characteristics under the same application pressure Y. The disclosed technology thus allows a user to form consistent parts at all times by using image collection and analysis to determine whether brazing material application has conformed to specifications or whether the brazing material application needs to be adjusted in some way (change in application pressure, change in application flow-rate, change in relative motion between substrate and brazing material applicator, and the like) in order to meet final product specifications. The image processing may be performed manually, but may also be performed in an automated fashion. In one embodiment, images of samples are compared to an idealized image of a desired sample.

In some embodiments, the brazing material may comprise one or more components having greater visibility under the illumination source than other components of the brazing material. This may be, e.g., a mixture of metals selected such that one of the metals has a particular visibility (or detectability) under near-infrared illumination.

Other methods that the present disclosure provides include (a) applying an amount of brazing material to a first substrate; (b) illuminating at least a portion of the applied brazing material with a source of illumination; (c) collecting at least one image of the illuminated applied brazing material; and (d) applying an amount of brazing material to a second substrate in response to the at least one image. Application, illumination, and image collection are all described elsewhere herein.

The methods may include applying an amount of brazing material to a second substrate in response to the at least one image, e.g., to fill in a gap that is identified from the at least one image. As described above, this technology allows a user to improve and maintain batch-to-batch consistency between different supplies of substrates, processing conditions, and brazing materials—brazing materials in particular may have variation between batches/supplies, and the present technology permits a user to produce consistent parts even when using two different batches of brazing material that may have different viscosities and hence different application characteristics.

As one example, the methods may adjust the amount of brazing material applied to a second substrate such that the amount is smaller than the amount of brazing material applied to a first substrate in the case where there was excess brazing material applied to the first substrate. Likewise, the methods may increase the amount of brazing material applied to the second substrate in the case where there was insufficient brazing material applied to the first substrate.

EXEMPLARY EMBODIMENTS

FIG. 1 depicts one illustrative embodiment. As shown in that figure, a ribbon of brazing material (dark) has been applied around the circumference of a tubular substrate. Under illumination, an imager collects an image of the brazing material and substrate. As seen in FIG. 1, there are two gaps (103 and 107) in the brazing material 101 that is disposed above the tubular substrate 105.

It should be understood that the present technology is applicable to substrates of any and all configurations, and that the tubular substrates shown herein are illustrative only. A substrate may be planar, curved, angled, or even have surface ridges, depressions, or valleys. As one example, a planar substrate may have brazing material deposited thereon, and—following image analysis—may then be brazed to another planar substrate.

Substrates may also be formed from a variety of materials, such as metals and metallic alloys. A substrate may comprise a single layer of material, but may also be a multi-walled material.

Figure 2:
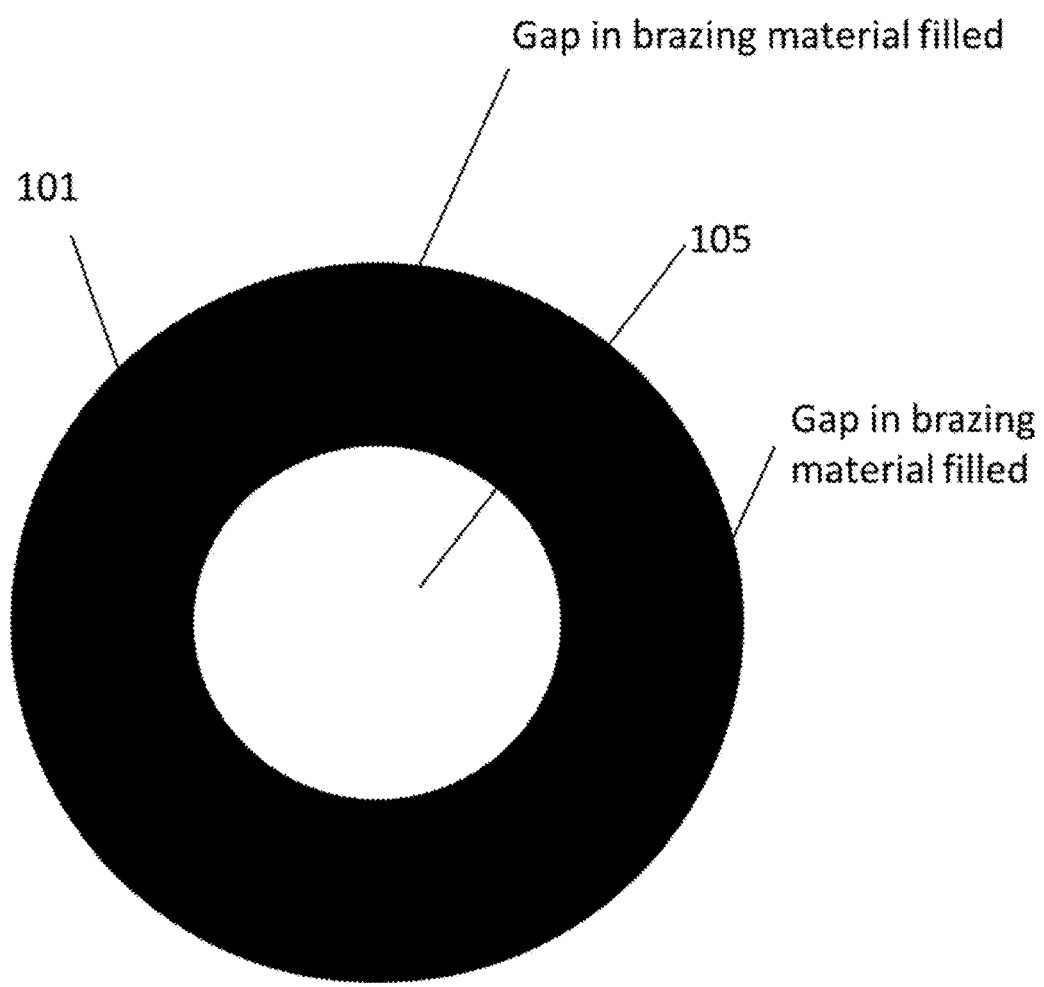
FIG. 2 depicts additional application of brazing material to areas having insufficient brazing material.

As shown in FIG. 2, the gaps (103 and 107 in FIG. 1) have been filled in with additional brazing material so as to place brazing material around the circumference of the substrate 105.

Figure 3:
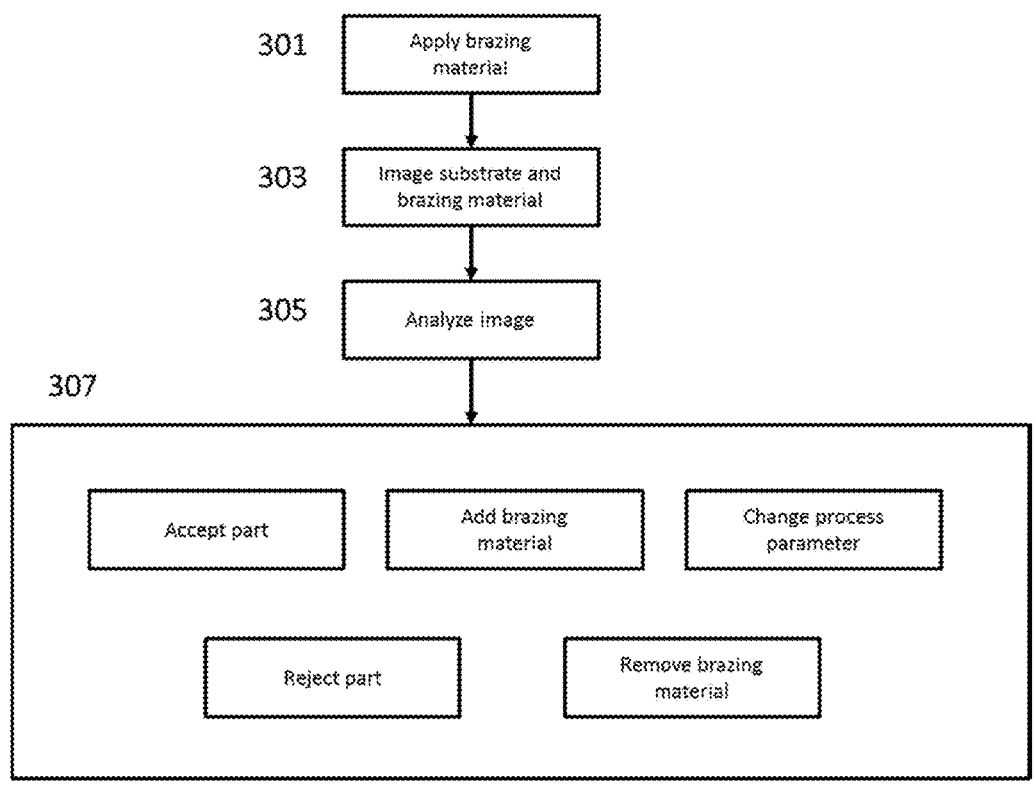
FIG. 3 depicts an exemplary process flowchart.

FIG. 3 provides an illustrative flowchart for the disclosed systems and methods. As shown in the chart, the systems may begin by applying brazing material to a substrate (301). Following application of brazing material, the system collects an image (303) of the brazing material and substrate and may then analyze the image (305).

As explained elsewhere herein, some or all of the analysis may be automated. For example, the analysis may include interrogating the image for substrate regions that are not surmounted by brazing material or for substrate regions that are surmounted by brazing material of inadequate thickness.

Based on this analysis, the substrate may undergo further processing (307). In some embodiments, the system may accept the part (i.e., analysis reveals that the brazing material application is within specification). In such cases, the part is then subject to further processing, e.g., brazing to another substrate.

If the analysis reveals that there is inadequate brazing material present, additional brazing material may be added to the necessary locations. It should be understood that in some embodiments, the system applies a first amount of brazing material, images and analyzes that first amount and then—based on the outcome of that analysis—applies a second amount of brazing material. The system may also apply and then analyze two separate amounts of brazing material simultaneously.

As shown in FIG. 3, the systems maybe also change one or more process parameters in response to an image. Process parameters may include the amount of brazing material applies, the relative motion of the substrate and the brazing material applicator, and the like.

A system may also reject a part in response to an image. A non-exclusive listing of bases for rejection includes inadequate application of brazing material, incorrect placement of brazing material, excess brazing material, and the like. In one particularly suitable embodiment, the system is provided with a set of specifications (e.g., brazing material thickness, brazing material location) to which an image is compared, and any parts that are outside the set of specifications are rejected (or recycled) or subject to further processing.

For example, a system according to the present disclosure may operate to map and digitize images of target braze-bearing workpieces. The system may then compare images of actual samples to those ideal substrates, e.g., images of shadows on either side of bead. The system may operate to determine the controlled volume of brazing material, the location of the brazing material, and other parameters. Based on an image analysis—e.g., a determination that braze material in a sample is not in all locations specified by the target workpiece, the sample may be discarded or returned to the production line for application of further brazing material to the desired location.

A system may also remove brazing material in response to an image, as FIG. 3 shows. Bases for removal include, e.g., the presence of excess brazing material or even the presence of misplaced brazing material, as revealed by image analysis of a substrate having brazing material applied thereon. Removal may be effected by a mechanical process (scraping, abrading, a chemical (e.g., solvent) process, or any combination thereof. Removal may be effected on a portion or on all of the brazing material that may be present on a substrate.

Illustrative Sequence of Operation

Vibratory feeder tables may be used to singulate parts for processing. The parts may be fed to a so-called pick zone where an LED or other illumination allows a vision guided robot to pick the parts individually. Vision guided robots pick a part and place it into the assembly jig. A robot may use a gripper that measures the length of each part before placing it into the jig. Out of specification parts may then be rejected or further processed.

In an assembly jig, opposing pneumatic actuators or other devices may push the parts into a center lane, assembling the parts. Actuators may then move assembled If needed, forming operations act to form and refine the substrates for braze material application. Braze paste is deposited, and after the braze paste has been deposited, the robot loads the boat back onto the conveyor and loads a new pallet of substrates into the braze station.

Brazed parts may be transported to an inspection station where machine vision cameras inspect the braze deposition. Incorrectly deposited parts are marked for reject or further processing; at the reject station, a series of pneumatic actuators may push rejected parts out.

It should be understood that the disclosed technology permits application of brazing to substrates in sequential, parallel, or both manners. For example, the disclosed technology may apply brazing material to a first substrate, image that substrate, analyze that image, and then further process that first substrate. Alternatively, the disclosed technology may apply brazing material to two or more substrates, image those substrates (simultaneously or sequentially), analyze those images (simultaneously or sequentially), and then further manipulate the substrates (simultaneously or sequentially). It should be understood that the disclosed technology may then operate in a batch or continuous mode.

The exemplary embodiments disclosed herein are exemplary only and should not be understood as limiting the scope of this disclosure or the appended claims. As one example, although the illustrative embodiments show tubular substrates having braze material applied circumferentially about the substrates, the disclosed technology is not limited to tubular substrates or circumferential application of brazing material.

What is claimed:

1. A brazing system, comprising:
   a first rotatable bearing having an axis of rotation;
   a second rotatable bearing having an axis of rotation,
   the first rotatable bearing being configured to rotatably support the first end of a substrate having a first end and a second end, and
   the second rotatable bearing being configured to rotatably support the second end of the substrate having a first end and a second end;
   a drive wheel configured to effect rotation of the substrate about an axis of rotation of the substrate when the first end of the substrate is supported by the first rotatable bearing and the second end of the substrate is supported by the second rotatable bearing,
   the drive wheel being disposed, as measured along the axis of rotation of the first rotatable bearing, between the first rotatable bearing and the second rotatable bearing, and
   the axis of rotation of the first rotatable bearing, the axis of rotation of the second rotatable bearing, and the axis of rotation of the substrate being parallel;
   an applicator configured to deliver an amount of a brazing material to a region of a surface of the substrate;
   a source of illumination configured to illuminate brazing material delivered by the applicator; and
   an imager configured to visualize illuminated brazing material applied to the surface of the substrate.

2. The brazing system of claim 1, wherein the system is configured to dispense an amount of brazing material from the applicator in response to one or more images collected by the imager.

3. The brazing system of claim 2, wherein the system is configured to adjust an amount of brazing material delivered by the applicator in response to one or more images collected by the imager.

4. The brazing system of claim 1, further comprising a supply of brazing material that comprises at least two components, at least one of the components having greater reflectance under the source of illumination than another component of the brazing material.

5. The system of claim 1, wherein the image is configured to image normal to the surface, parallel to the surface, or at an angle to the surface.

6. The system of claim 1, wherein the amount of the brazing material is characterized as having a length and a thickness.

7. The system of claim 1, wherein the imager is configured to image the thickness of the brazing material along at least 80% of the length of the amount of brazing material.

8. The system of claim 7, wherein the imager is configured to image the thickness of the brazing material along at least 90% of the length of the amount of brazing material.

9. The system of claim 1, wherein the region of the surface is characterized as a perimeter.

10. The system of claim 9, wherein the perimeter is characterized as a circumference.

11. The system of claim 1, wherein the source of illumination comprises a source of visible light, a source of infrared illumination, a source of ultraviolet illumination, or any combination thereof.

12. The system of claim 1, further comprising a heated region, the heated region being configured to receive the substrate and amount of brazing material.

13. A method, comprising:
   (a) applying an amount of brazing material to a first substrate having (i) a first end, (ii) a second end, and (iii) an axis of rotation,
   the first end of the substrate being supported by a first rotatable bearing having an axis of rotation,
   the second end of the substrate being supported by a second rotatable bearing having a second axis of rotation,
   the substrate being rotated about the axis of rotation of the substrate by a drive wheel configured to effect rotation of the substrate about the axis of rotation of the substrate while the first end of the substrate is supported by the first rotatable bearing and the second end of the substrate is supported by the second rotatable bearing,
   the drive wheel being disposed, as measured along the axis of rotation of the first rotatable bearing, between the first rotatable bearing and the second rotatable bearing, and
   the axis of rotation of the first rotatable bearing, the axis of rotation of the second rotatable bearing, and the axis of rotation of the substrate being parallel;
   (b) illuminating at least a portion of the applied brazing material with a source of illumination;
   (c) collecting at least one image of the illuminated applied brazing material; and
   (d) manipulating the first substrate in response to the at least one image.

14. The method of claim 13, wherein the manipulating comprises conveying the first substrate to a heated location, changing the spatial orientation of the first substrate, conveying the first substrate to a holding location, adding additional brazing material to the first substrate, removing brazing material from the first substrate, reshaping brazing material on the first substrate, brazing the first substrate to a second substrate, or any combination thereof.

15. The method of claim 14, wherein the manipulating comprises applying additional brazing material to the first substrate.

16. The method of claim 13, wherein the illumination is visible light, infrared illumination, ultraviolet illumination, or any combination thereof.

17. The method of claim 16, wherein the brazing material comprises one or more components having greater visibility under the illumination source than other components of the brazing material.

18. The method of claim 13, wherein one or more of (a), (b), (c), or (d) are performed in an automated fashion.

19. The method of claim 13, wherein one or more of (a), (b), (c), or (d) are performed in a manual fashion.

20. A method, comprising:
   (a) applying an amount of brazing material to a first substrate having (i) a first end, (ii) a second end, and (iii) an axis of rotation,
   the first end of the substrate being supported by a first rotatable bearing having an axis of rotation,
   the second end of the substrate being supported by a second rotatable bearing having a second axis of rotation,
   the substrate being rotated about the axis of rotation of the substrate by a drive wheel configured to effect rotation of the substrate about the axis of rotation of the substrate while the first end of the substrate is supported by the first rotatable bearing and the second end of the substrate is supported by the second rotatable bearing,
   the drive wheel being disposed, as measured along the axis of rotation of the first rotatable bearing, between the first rotatable bearing and the second rotatable bearing, and
   the axis of rotation of the first rotatable bearing, the axis of rotation of the second rotatable bearing, and the axis of rotation of the substrate being parallel;
   (b) illuminating at least a portion of the applied brazing material with a source of illumination;
   (c) collecting at least one image of the illuminated applied brazing material; and
   (d) applying an amount of brazing material to a second substrate in response to the at least one image.

* * * * *